Patented Mar. 15, 1938

2,111,491

UNITED STATES PATENT OFFICE 2,111,491

PROCESS OF PREPARING PHOSPHORIC ACID ESTERS OF HYDROXYALKYL ISO-ALLOXAZINES

Richard Kuhn and Hermann Rudy, Heidelberg, Germany, assignors to Winthrop Chemical Company, Inc., New York, N. Y., a corporation of New York No Drawing. Application January 24, 1936, Serial No. 60,742. In Germany January 26, 1935

12 Claims. (Cl. 260—29)

This invention relates to a process of preparing phosphoric acid esters of poly-hydroxyalkyl-isoalloxazines.

Poly-hydroxyalkyl substitution products of isoalloxazines (flavines) show a growth promoting action which is similar to the physiological activity of vitamin $B_2$ (compare our copending application Serial No. 29,732, filed July 3, 1935).

In accordance with the present invention derivatives of the said 9-poly-hydroxyalkyl-isoalloxazines of biological interest are obtainable by reacting upon the 9-poly-hydroxyalkyl-isoalloxazines with a phosphorus compound selected from the group consisting of phosphorus halides, phosphorus oxyhalides, phosphorus oxides and metaphosphoric acid esters. Phosphoric acid esters are thus obtainable which are considered to have the following general formula:

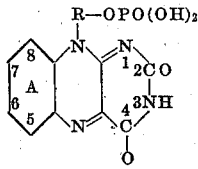

wherein A stands for an aromatic ring system, preferably of the benzene series and R stands for a hydroxyalkyl group.

In accordance with the present invention the manufacture of the said phosphoric acid esters of 9-poly-hydroxyalkyl-isoalloxazines (flavines) is performed by reacting upon a 9-hydroxyalkyl-isoalloxazine with a phosphorus halide or oxyhalide, or with a phosphorus oxide or meta-phosphoric acid ester. Phosphorus oxychloride is preferably used as the esterifying agent. The reaction is advantageously carried out in the presence of an organic base, such as pyridine, quinoline, triethylamine and the like. Instead of the 9-poly-hydroxyalkyl-isoalloxazines also derivatives thereof containing at least one free hydroxyl group, such as the acetals, particularly their acetone compounds, may be employed. The reaction is best started at low temperature and further carried out while gently heating. The phosphorus compounds may be used in excess.

The esters thus obtainable may be further purified by means of their difficultly soluble metal salts, for instance, by means of their lead, copper, barium, calcium salts and preferably by means of their red silver salts from which the acid phosphoric acid esters are liberated in the usual manner, for instance by means of hydrogen sulfide. In the form of their alkali metal salts the ester compounds are well crystallized compounds which dissolve in water. In the electric field they migrate to the anode, contrary to the 9-poly-hydroxyalkyl-isoalloxazines themselves. If unchanged starting material is present in the reaction product the latter may be separated therefrom by esterifying or etherifying the hydroxyl groups of the poly-hydroxyalkyl-isoalloxazine and the still free hydroxyl groups of the reaction product. The esterification or etherification may be carried out by means of organic acylating agents, such as acetic acid anhydride or by acetalization, for instance, with acetone. The aqueous solutions of the ethers or esters thus obtained are then extracted by means of a suitable organic solvent, such as a halogenated hydrocarbon, for instance, chloroform or carbon tetrachloride, or by means of alcohols, particularly higher membered alcohols, such as butyl and amyl alcohol, or by means of organic esters, such as acetic ester. By an extraction process of the said kind the ester or acetal compound of the starting material is dissolved by the extracting agent, whereas the phosphoric acid ester compound remains in the aqueous solution. By careful treatment with a dilute acid or alkali lye, the hydroxyl groups may then be set free without splitting off the phosphoric acid radical.

The phosphoric acid esters of the 9-poly-hydroxyalkyl-isoalloxazines, particularly those of 9-poly-hydroxyamyl- 6.7-dimethyl-isoalloxazines, for instance, the phosphoric acid ester of 9-(d-ribityl)-6.7-dimethyl-isoalloxazine, form products with albuminous substances which exert a catalytic action on oxidation processes. Thus, for instance, a catalytic action on the oxidation of hexose-mono-phosphoric acid may be detected. Furthermore, the phosphoric acid esters, similar to the 9-polyhydroxyalkyl-isoalloxazines themselves, exert a growth promoting action.

The invention is further illustrated by the following examples without being restricted thereto:—

*Example 1.*—2.68 parts by weight of phosphorus oxychloride are added to the ice cooled solution of 6.5 parts by weight of 6.7-dimethyl-9-(d-ribityl)-isoalloxazine in 3500 parts by weight of pyridine. The mixture is left standing for one hour at 0° C. and for further 8 hours at room temperature in the dark and then treated with ice and sodium acetate. After the pyridine has evaporated in vacuo, the crude product is taken up in 3000 parts by weight of water and treated with aqueous silver nitrate. After cooling to 0° C. a red silver salt separates in flakes. It is dissolved in 20% acetic acid while adding sodium acetate while warm and is decomposed while introducing hydrogen sulfide. The mixture is filtered and the solution which is free from silver is concentrated and treated with an excess of alcohol. On standing in the refrigerator, the mono-sodium salt of the 6.7-dimethyl-9-(d-ribityl)-isoalloxazine phosphoric acid crystallizes in a good yield. According to analysis the product corresponds to the formula: $C_{17}H_{19}N_4O_5$—$OPO_3H_2$.

*Example 2.*—5 parts by weight of 9-dihydroxypropyl-flavine (9-dihydroxypropyl-isoalloxazine) melting at 300° C. are dissolved in 10,000 parts by weight of pyridine while hot, and, after cooling with ice, treated with an ice cooled solution of 2.67 parts by weight of freshly distilled phosphorus oxychloride in 100 parts by weight of pyridine. After standing for 20 hours at room temperature in the dark, the mixture is treated with a small quantity of sodium acetate while adding ice, evaporated to dryness in vacuo and redistilled twice with a small quantity of water in order to remove the pyridine. The residue is dissolved in 30,000 parts by weight of water while hot, and the silver salt of the flavine phosphoric acid is precipitated by means of silver nitrate at weakly ammoniacal reaction. The flocculent precipitate is washed with water, taken up in hot acetic acid and decomposed with hydrogen sulfide after the addition of sodium acetate. The silver sulfide precipitate is washed with warm water. The solution which has been centrifuged off is evaporated to dryness together with the washing water, the residue is dissolved in hot water, filtered and treated with the same volume of alcohol while hot. The sodium salt of 9-dihydroxypropyl-flavine phosphoric acid crystallizes in thin needles which combine to ball-like aggregates. In the electric field (pH 7.2; 220 volts, 15 milliamperes) it migrates to the anode.

In an analogous manner the phosphoric acid esters of 6.7-dimethyl-9-dihydroxypropyl-flavine and of 9-(1-arabityl)- and 9-(d-arabityl)-flavine and of the corresponding 6.7-dimethyl compounds are obtained when starting with the corresponding flavine compounds.

Example 3.—3.45 parts by weight of 6.7-dimethyl-9-(d-ribityl)-isoalloxazine are dissolved in 4000 parts by weight of dry pyridine while hot. A mixture of 17.5 parts by weight of phosphorus oxychloride with 200 parts by weight of pyridine is added to the solution which has been cooled to 25–30° C. After 12 hours' standing at room temperature the mixture is occasionally heated to 40–50° C. while subsequently adding further phosphorus oxychloride (5 parts by weight in 50 parts by weight of pyridine). For completing the phosphorylation the mixture is repeatedly heated within the next 24 hours to 50° C. eventually while adding further phosphorus oxychloride. It is then heated with 10 parts by weight of acetic anhydride for a quarter of an hour to 70–80° C., about 5000 parts by weight of ice are added and the non-phosphorylated flavine extracted as tetra-acetyl compound by means of chloroform (three times with one third of the total volume). The aqueous layer is acidified with glacial acetic acid and the phosphoric acid ester adsorbed to 300 parts by weight of fuller's earth of the kind of the "Frankonit". Elution takes place by means of stirring with a pyridine-methanol-water-mixture at 70° C. The dyestuff liberated from pyridine and methanol by concentration is precipitated with silver nitrate and ammonia, the silver salt is decomposed with hydrogen sulfide and the filtrate of the silver sulfide strongly concentrated in vacuo. For splitting off the acetyl groups the mixture is rendered about 0.5 normal alkaline and neutralized after some minutes with acetic acid. 1 part by volume of the concentrate is left standing in the refrigerator with one third part by volume of molar calcium acetate solution and 1 part by volume of ethyl alcohol, whereby the calcium salt of the 6.7-dimethyl-9-(d-ribityl)-isoalloxazine is obtained in yellow flakes.

Example 4.—1 part by weight of 9-dihydroxypropyl-isoalloxazine is dissolved in 2000 parts by weight of dry pyridine while hot and, after cooling to 25° C., treated with 10 parts by weight of phosphorus oxychloride in 200 parts by weight of pyridine. The further working up proceeds as in Example 3. The properties of the product thus obtained correspond to the properties of the product obtained according to Example 2.

We claim:—
1. The process which comprises reacting upon a compound selected from the group consisting of 9-polyhydroxyalkyl-isoalloxazines and derivatives thereof containing at least one free hydroxyl group with a phosphorus compound selected from the group consisting of phosphorus halides, phosphorus oxyhalides, phosphorus oxides and metaphosphoric acid esters.

2. The process which comprises reacting upon a compound selected from the group consisting of 9-polyhydroxyalkyl-isoalloxazines and derivatives thereof containing at least one free hydroxyl group with a phosphorus compound selected from the group consisting of phosphorus halides, phosphorus oxyhalides, phosphorus oxides and metaphosphoric acid esters in the presence of an organic base.

3. The process which comprises reacting upon a compound selected from the group consisting of 9-polyhydroxyalkyl-isoalloxazines and derivatives thereof containing at least one free hydroxyl group with phosphorus oxychloride in the presence of an organic base.

4. The process which comprises reacting upon a compound selected from the group consisting of 9-polyhydroxyalkyl-isoalloxazines and derivatives thereof containing at least one free hydroxyl group with phosphorus oxychloride in the presence of an organic base while gently heating.

5. The process which comprises reacting upon a 9-tetrahydroxyamyl-isoalloxazine with phosphorus oxychloride in the presence of an organic base while gently heating.

6. The process which comprises reacting upon a 9-polyhydroxyalkyl-isoalloxazine with phosphorus oxychloride in the presence of pyridine.

7. The process which comprises reacting upon a 9-polyhydroxyalykl-isoalloxazine with phosphorus oxychloride in the presence of pyridine while gently heating.

8. The process which comprises reacting upon a 9-tetrahydroxyamyl-isoalloxazine with phosphorus oxychloride in the presence of pyridine while gently heating.

9. The process which comprises reacting upon a 6.7-dimethyl-9-tetrahydroxyamyl-isoalloxazine with a phosphorus compound selected from the group consisting of phosphorus halides, phosphorus oxyhalides, phosphorus oxides and metaphosphoric acid esters in the presence of an organic base.

10. The process which comprises reacting upon a 6.7-dimethyl-9-tetrahydroxyamyl-isoalloxazine with phosphorus oxychloride in the presence of a base while gently heating.

11. The process which comprises reacting upon a 6.7-dimethyl-9-tetrahydroxyamyl-isoalloxazine with phosphorus oxychloride in the presence of pyridine while gently heating.

12. The process which comprises reacting upon 6.7-dimethyl-9-(d-ribityl)-isoalloxazine with phosphorus oxychloride in the presence of pyridine while gently heating.

RICHARD KUHN.
HERMANN RUDY.